(No Model.) 2 Sheets—Sheet 1.
J. A. MITCHELL.
IMPLEMENT FOR PLASHING HEDGES.
No. 573,343. Patented Dec. 15, 1896.
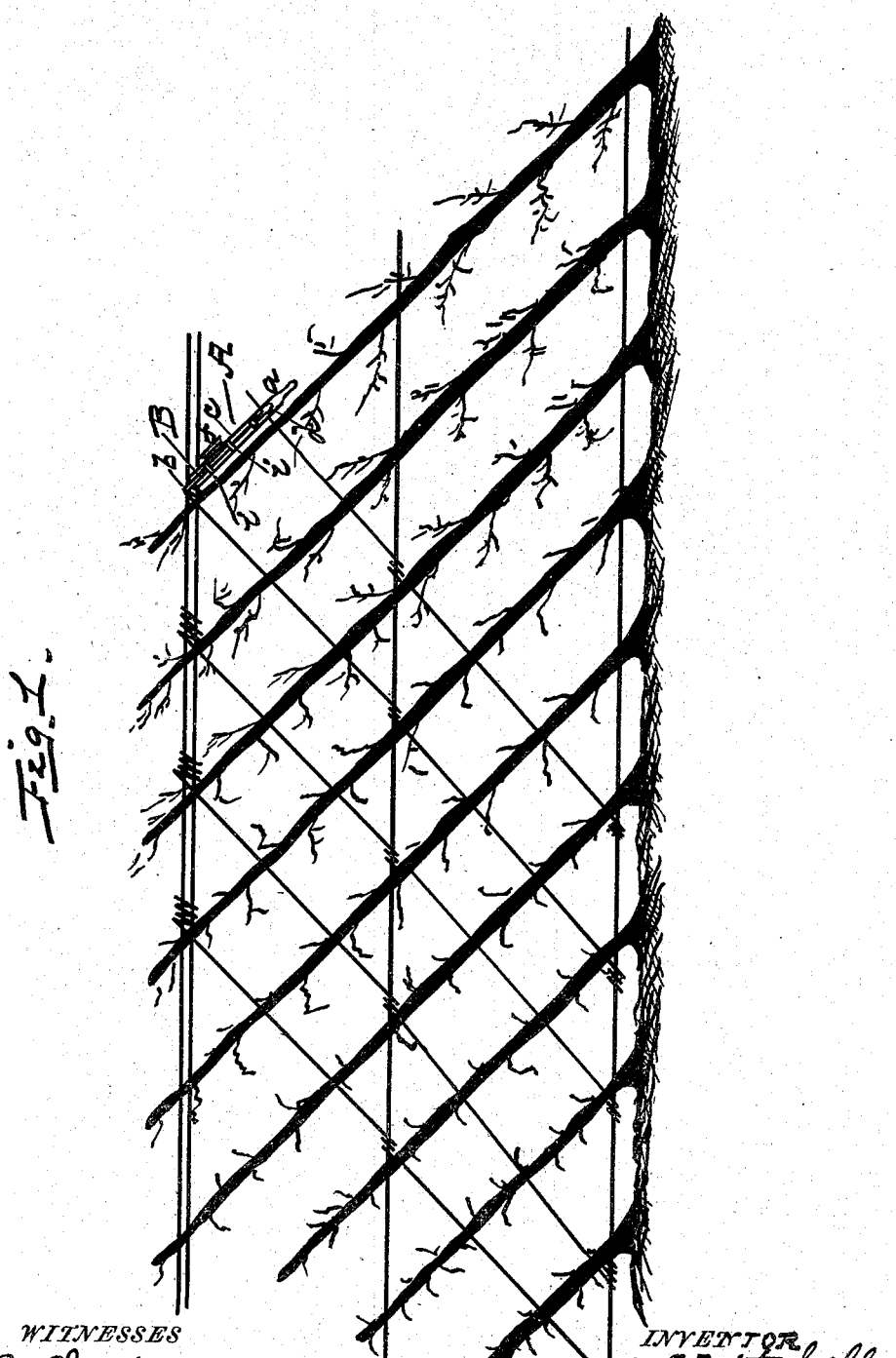

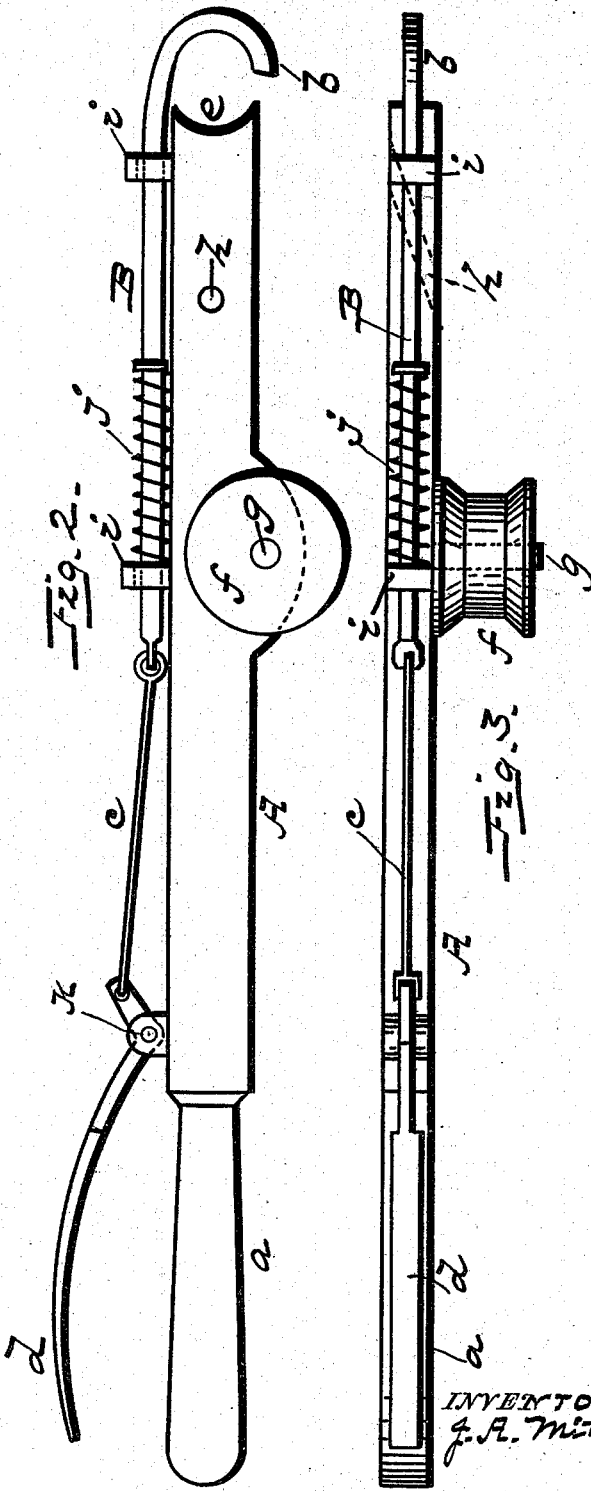

UNITED STATES PATENT OFFICE.

JAMES A. MITCHELL, OF WARREN, INDIANA, ASSIGNOR OF ONE-HALF TO EDWARD C. KEYES, OF TIFFIN, OHIO.

IMPLEMENT FOR PLASHING HEDGES.

SPECIFICATION forming part of Letters Patent No. 573,343, dated December 15, 1896.

Application filed February 25, 1896. Serial No. 580,666. (No model.)

*To all whom it may concern:*

Be it known that I, JAMES A. MITCHELL, a citizen of the United States, residing at Warren, in the county of Huntington and State of Indiana, have invented certain new and useful Improvements in Implements for Plashing Hedges; and I do hereby declare the following to be a full, clear, and exact description of the invention, such as will enable others skilled in the art to which it appertains to make and use the same.

This invention has relation to improvements in devices for plashing hedges with wire; and it consists in the novel construction and arrangement of a hand plashing implement which is designed to carry the plashing-wire as well as tie the same at the desired points on the horizontal wires of the hedge, all as will be hereinafter more fully explained.

The annexed drawings, to which reference is made, fully illustrate my invention, in which—

Figure 1 represents a side view of a hedge, the same plashed, as well as my device applied thereto. Fig. 2 is a side view of the plashing device. Fig. 3 is a plan view of the same.

Referring by letter to the accompanying drawings, A is the hedge-plashing implement, comprising a handle $a$ and a grasping-bar B, having a hook $b$ at one end and a rod $c$ at the other end and interposed between the same and a lever $d$. This tool A is provided with a curved end $e$ and a spool $f$, mounted on a short shaft $g$ on the side of the implement. A diagonal opening $h$ is made in and through the forward portion of the implement, through which the wire passes from the spool and out of the opening on the opposite side at a point near the curved end, as will be further explained.

The grasping-bar is arranged upon the forward end of the tool, with the hooked portion $b$ directly opposite the curved end of said tool, and has its sliding movement in a pair of eyes or staples $i\ i$. A coiled spring $j$ upon the grasping-bar serves to retract the hook from the curve when it is desired to release the same from the horizontal wire.

The lever $d$ is pivoted to the bar or tool A at $k$, and is used by the operator for the purpose of causing the hook above mentioned to grasp the horizontal wire of the hedge.

The operation of my device is as follows: After the hedge-stalks are inclined and the horizontal line-wires are in position the operator in plashing the same commences at the lower horizontal wire and ties the end of the plashing-wire thereto, and the implement is then attached to the second horizontal wire by the hook and curved end of the tool and revolved around said wire in front of the stalk at the same time the plashing-wire is being paid out from the spool into and through the diagonal opening in the implement. After this twist is made around the horizontal wire the tool is then released therefrom by the operator releasing the lever $d$, and by means of the coiled spring the hook separates from the curved end of the tool, when the tool is raised and carried to the top wire, the hooked end made to grasp the same, when the tool is then revolved and the plashing-wire is twisted around the top wire, after which the plashing-wire is cut, the tool released from said top wire, and the same operation is performed or repeated until the hedge-plants are plashed.

Having thus described my invention, what I claim, and desire to secure by Letters Patent, is—

In an implement for plashing hedges the combination with the body portion provided with a handle, a concave or rearwardly-curved front end, and a spool intermediate of its ends mounted on a short laterally-projecting shaft and adapted to carry the plashing-wire, and guiding eyes or staples projecting from the edge of the body portion opposite the spool, of the grasping-bar having a rearwardly-curved hook end, a retracting-spring coiled around the grasping-bar, a lever fulcrumed to the body portion of the tool, and a rod connecting the rear end of the grasping-bar with the operating-lever, substantially as specified.

In testimony whereof I affix my signature in presence of two witnesses.

JAMES A. MITCHELL.

Witnesses:
LEVI L. SIMONS,
EZRA C. THOMPSON.